United States Patent [19]
Pabst et al.

[11] Patent Number: 6,102,459
[45] Date of Patent: Aug. 15, 2000

[54] VACUUM VALVE

[76] Inventors: William V. Pabst, 337 Calumet Trace, Murfreesboro, Tenn. 37129; Bertrand S. De Pecker, Leopold-3-laan 1, Sterrebeek, 1933, Belgium

[21] Appl. No.: 09/039,753

[22] Filed: Mar. 16, 1998

[51] Int. Cl.⁷ .................................................. B66C 1/02
[52] U.S. Cl. ................... 294/64.1; 294/64.2; 294/907; 414/627
[58] Field of Search ................. 294/64.1, 64.2, 294/64.3, 907; 414/627, 737, 752

[56] References Cited

U.S. PATENT DOCUMENTS

| | | | |
|---|---|---|---|
| 3,181,563 | 5/1965 | Giffen | 294/64.2 |
| 3,219,380 | 11/1965 | Carlisss | 294/64.1 |
| 3,314,559 | 4/1967 | Horton | 414/627 |
| 3,322,454 | 5/1967 | Mindrum | 294/64.1 |
| 3,677,598 | 7/1972 | Becker | 294/64.1 |
| 3,756,563 | 9/1973 | Stone | 294/64.1 |
| 3,765,542 | 10/1973 | White | 294/64.1 |
| 3,845,950 | 11/1974 | Kuzniak | 271/194 |
| 3,923,177 | 12/1975 | Horton | 294/64.1 |
| 3,933,388 | 1/1976 | Conboy | 294/64.2 |
| 4,266,905 | 5/1981 | Birk et al. | 294/64.1 |
| 4,557,659 | 12/1985 | Scaglia | 414/627 |
| 4,561,687 | 12/1985 | Bostrom | 294/64.1 |
| 4,850,780 | 7/1989 | Safabakhsh et al. | 414/627 |
| 5,035,568 | 7/1991 | Joulin | 414/752.1 |
| 5,284,334 | 2/1994 | Yamamoto | 294/64.1 |
| 5,344,202 | 9/1994 | Ramler et al. | 414/627 |
| 5,431,469 | 7/1995 | Ohno et al. | 294/64.1 |

FOREIGN PATENT DOCUMENTS

| | | | |
|---|---|---|---|
| 163735 | 7/1964 | U.S.S.R. | 294/64.1 |
| 1036657 | 8/1983 | U.S.S.R. | 294/64.1 |

*Primary Examiner*—Dean J. Kramer
*Assistant Examiner*—Paul T. Chin
*Attorney, Agent, or Firm*—Ellis, Venable & Busam LLP.

[57] ABSTRACT

The present invention is a vacuum valve assembly that creates vacuum on demand. The assembly has a body with a fluid inlet port, a fluid outlet port, a fluid flow channel extending between the fluid inlet port and the fluid outlet port, a vacuum port, a low pressure channel extending between the vacuum port and the fluid flow channel, a sensing member receiving channel, the sensing member receiving channel extending between the fluid flow channel and the low pressure channel, and a flow occlusion chamber that intersects the fluid flow channel. There is a sensing member with a fluid flow regulation portion and a sensing portion. The sensing portion is adapted to be movably received by the sensing member receiving channel. The sensing member is movable from a closed position to an open position. When the sensing member is in the closed position the fluid flow regulation portion closes the fluid flow channel to the flow of fluids, and when the sensing member is in the open position the fluid flow channel is open to the flow of fluids. When fluids flow through the flow channel a low-pressure condition is created within the low-pressure channel.

10 Claims, 8 Drawing Sheets

VACUUM VALVE

FIELD OF THE INVENTION

The present invention relates generally to lifting and securing devices. More particularly, the present invention relates to the field of vacuum valve systems used to secure and lift objects.

BACKGROUND

There are many industrial applications that benefit for having an object held securely in place, primarily manufacturing processes. In the past, a worker manually held the object in place with one hand and operated on the object with the remaining hand. This led to great manufacturing inefficiencies and safety concerns.

Clamps may be used to hold objects securely in place. However, the extra time and effort in placing and securing the clamps is also inefficient in a manufacturing process. Further, many objects have inconvenient shape or outlines that make efficient clamping difficult, if not impossible.

Recently, there has been increased interest in devices that use vacuum to hold or secure objects. These devices appear to fall into two categories: devices designed for assembly line type operations and devices designed for use with cargo moving vehicles. These all have the same limitations, i.e., they require a standing vacuum as a part of the system.

An example is U.S. Pat. No. 3,219,380 issued to Carliss ("Carliss"). The device disclosed in Carliss uses compressed air to create a vacuum that is stored in a vacuum tank. The vacuum tank is in open communication with vacuum valves that are located directly over the vacuum pads. When a sensor detects an object, the vacuum valve is opened to the vacuum pads, thereby evacuating the volume within the vacuum pad and securing the detected object to the vacuum pad.

Other examples are U.S. Pat. No. 3,314,559 issued to Horton ("Horton"). Horton discloses a vacuum attachment that uses a vacuum pump to create a standing vacuum within a hollow frame/vacuum storage tank. The vacuum storage tank is connected via a hose to a sensing valve in the vacuum cup. Thus, when the sensing valve detects an object, it opens, thereby evacuating the air contained in the vacuum cup into the vacuum. Other examples are U.S. Pat. No. 3,322,454 issued to Mindrum, U.S. Pat. No. 4,561,687 issued to Bostrom, and U.S. Pat. No. 5,431,469 issued to Ohno et al.

Another type of vacuum holding device is disclosed in U.S. Pat. No. 3,845,950 issued to Kuzniak ("Kuzniak") in which a suction box is provided. The suction box of this device is constantly in a partially evacuated condition when in use. Adjacent compartments, which are separated from the suction box by a series of flaps, are normally open to the atmosphere. When the adjacent compartment become blocked by an object, the flaps open to the suction box thereby evacuating the adjacent compartments and securing the object to be held. U.S. Pat. No. 5,035,568 issued to Joulin discloses a similar device.

These devices, however, require a standing vacuum that is accessible upon the detection of an object. This is both wasteful of energy and creates extra maintenance work on the vacuum components.

Therefore, there is a current and continuing need for a vacuum valve that does not require a standing vacuum for operation. There is especially a need for a vacuum valve that creates the needed vacuum only upon the detection of an object, vacuum-on-demand.

SUMMARY OF THE INVENTION

It is an object of the present invention to provide a valve assembly that is adapted to create a vacuum on demand.

It is another object of the present invention to provide a valve assembly that has a sensor, which creates a vacuum on demand when in contact with a detected object.

It is a further object of the present invention to provide a valve assembly that detects contact with an object and, upon detection of the object, creates a vacuum on demand. The vacuum thus created being used to secure or hold the object to the assembly.

It is yet another object of the present invention to provide a valve assembly that uses pressurized air to create a vacuum used to hold or secure objects.

It is still yet another object of the present invention to provide a valve assembly that uses the Venturi effect to create a vacuum-on-demand, the vacuum being used to hold or secure objects.

BRIEF DESCRIPTION OF THE DRAWINGS

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings wherein:

FIG. 8b is a cut-way view of FIG. 8a showing the fluid flow channels within the turnstile according to the orientation of FIG. 8a;

FIG. 9b is a cut-away view of FIG. 9a showing the fluid flow channels according to the orientation of FIG. 9a.

DESCRIPTION OF PREFERRED EMBODIMENTS

Figure 1:
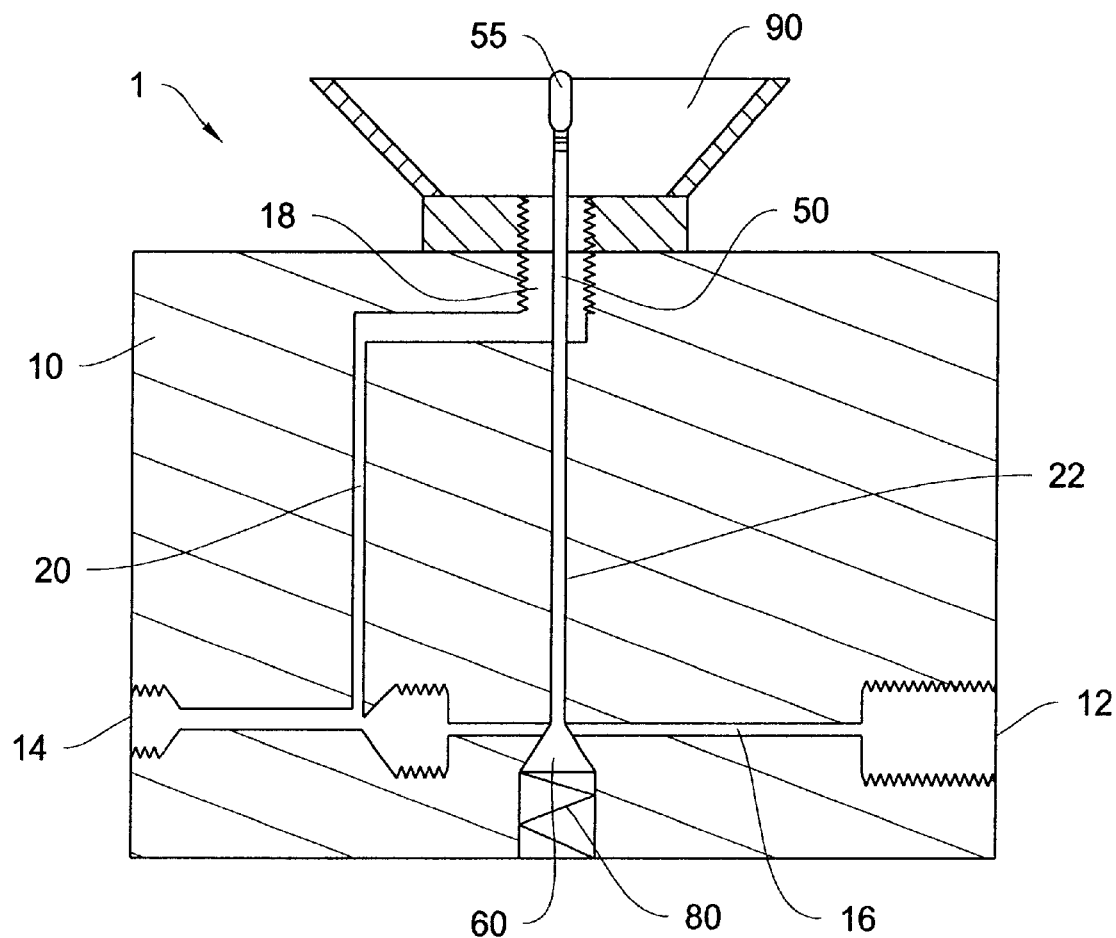
FIG. 1 is a vacuum valve according to the present invention, the valve is in a closed position that blocks pressurized airflow.

The present invention is a valve assembly 1 that is useful for releasably securing or holding objects. The valve assembly 1 senses the presence of an object to be held or secured, then, upon detection of the object, creates a vacuum on demand.

The assembly 1 has a body 10 with a fluid inlet port 12, a fluid outlet port 14, a fluid flow channel 16 extending between the fluid inlet port 12 and the fluid outlet port 14. There is a vacuum port 18 and a low pressure channel 20 that extends between the vacuum port 18 and the fluid flow channel 16. Further, there is a sensing member receiving channel 22 that extends from the fluid flow channel 16 to the exterior of the body 10. Finally, there is a flow occlusion chamber 24 that intersects the fluid flow channel 16.

The assembly also has a sensing member 50 with a fluid flow regulation portion 60 and a sensing portion 55. The sensing member 50 is adapted to be movably received by the sensing member receiving channel 22. The sensing member 50 is movable from a closed position to an open position. When the sensing member 50 is in the closed position the fluid flow regulation portion 60 prevents, at least in part, flows of fluids through the fluid flow channel 16. When the sensing member 50 is in the open position the fluid flow channel 16 is open to the flow of fluids. When fluids flow through the flow channel 16, a low-pressure condition is created within the low-pressure channel 20. Thus, the assembly 1 creates a vacuum-on-demand.

Figure 2:
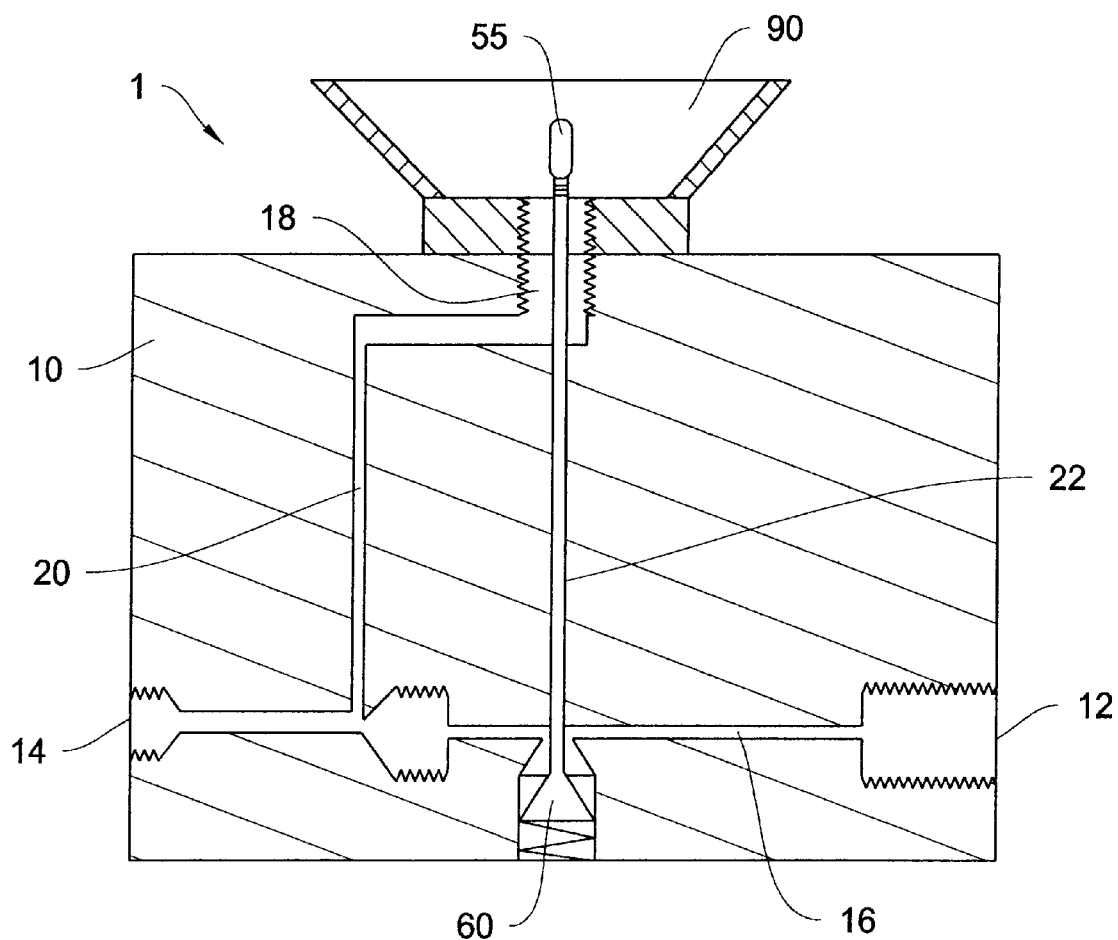
FIG. 2 is the vacuum valve according to the present invention, the valve is in an open position thereby allowing airflow and the creation of a vacuum within the valve body.
Figure 3:
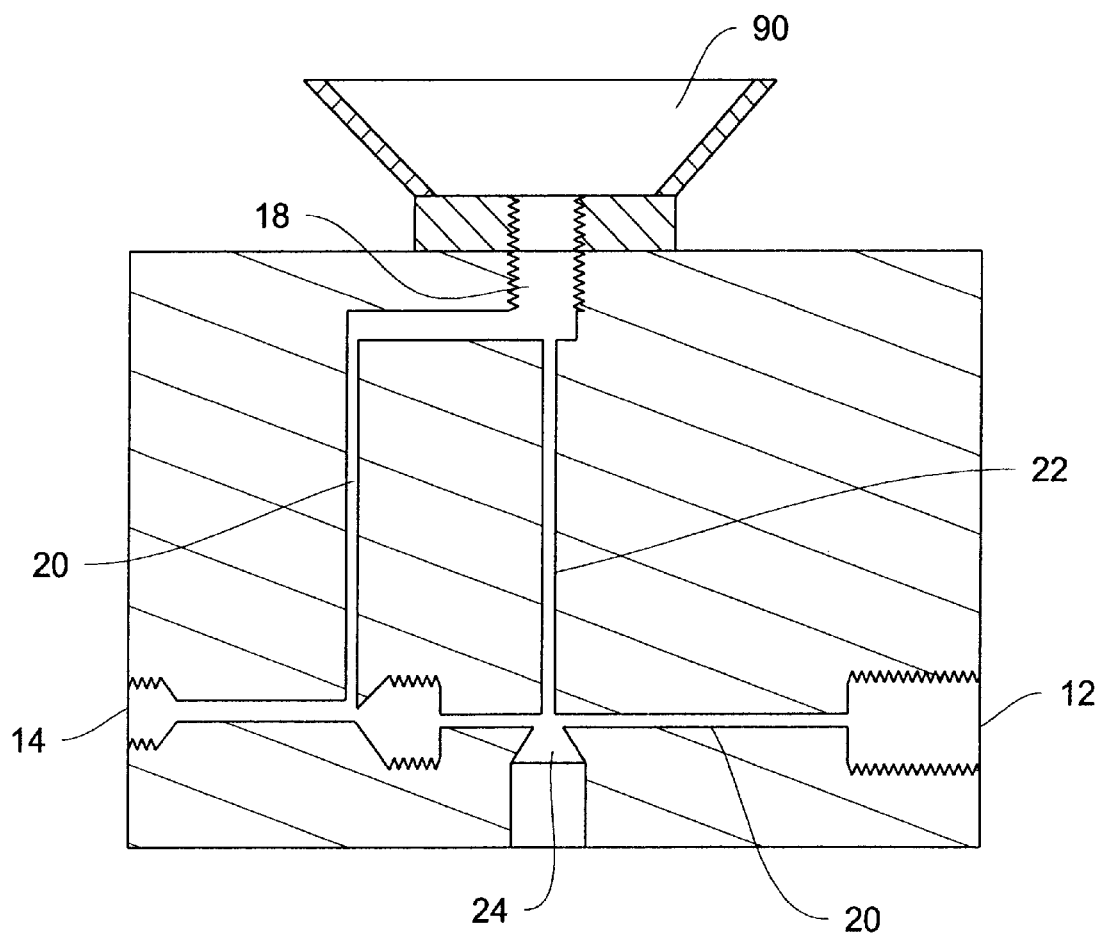
FIG. 3 is the body of the vacuum valve without the sensing member.
Figure 5:
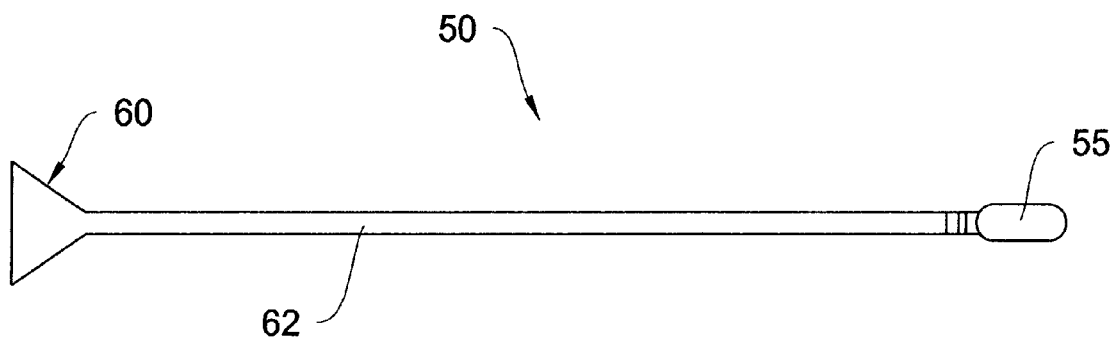
FIG. 5 illustrates an alternate embodiment of the vacuum valve according to the present invention.
Figure 7:
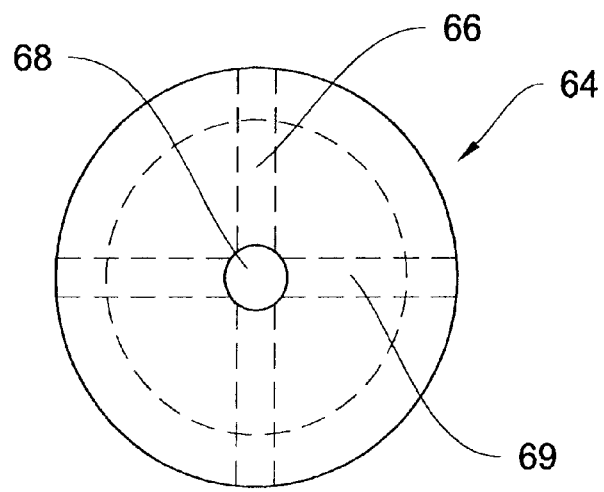
FIG. 7 is a top view of the turnstile according to the present invention.
Figure 6:
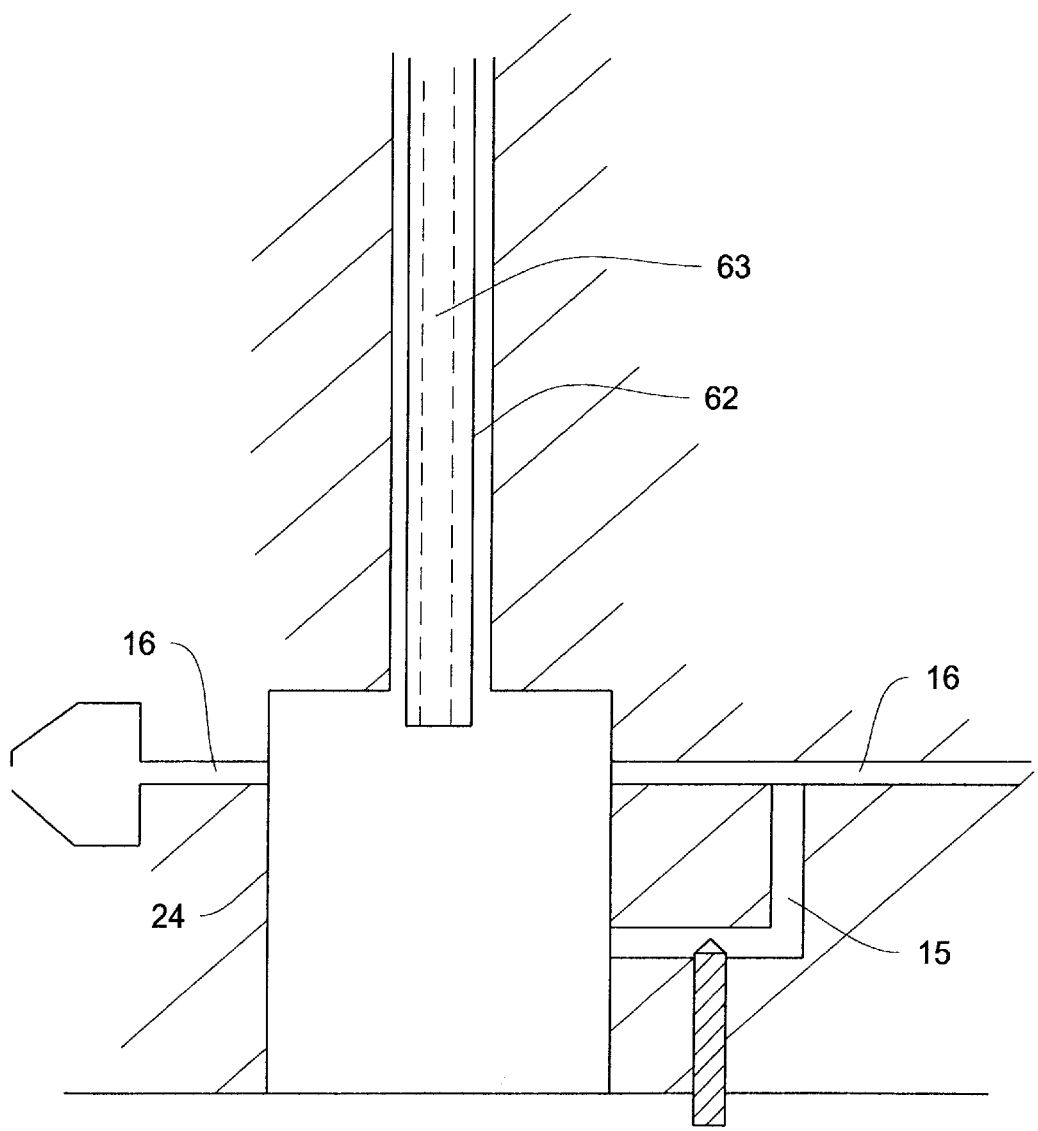
FIG. 6 illustrates the turnstile chamber of the alternate embodiment of the present invention without the gear present, but with the shaft of the sensing member present.
Figure 8A:
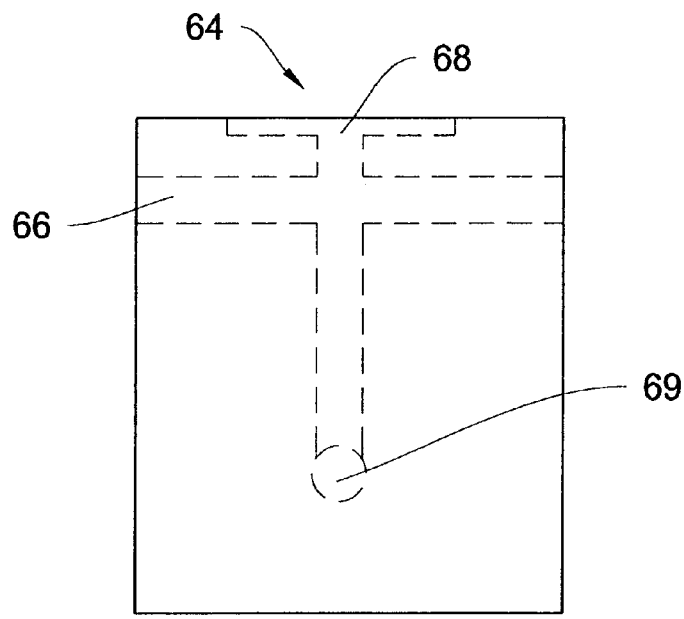
FIG. 8a is a side view of an embodiment of the turnstile of the present invention, the dashed lines show hidden lines.
Figure 8B:
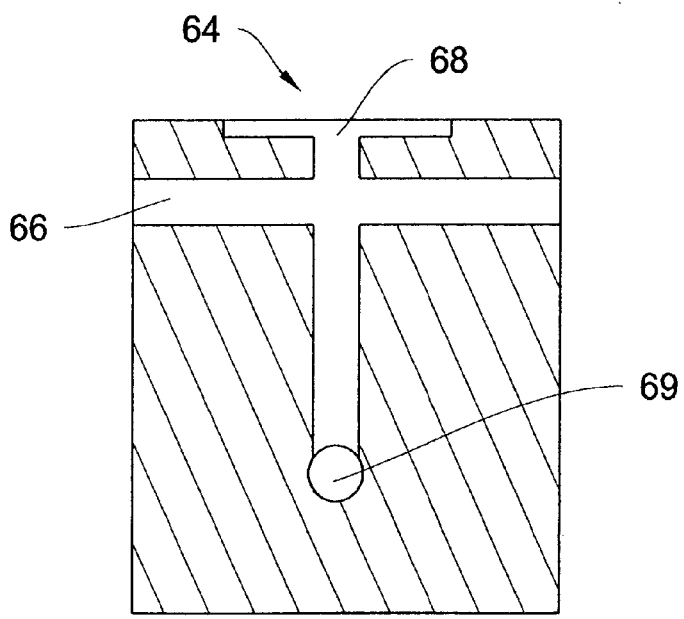
Figure 9A:
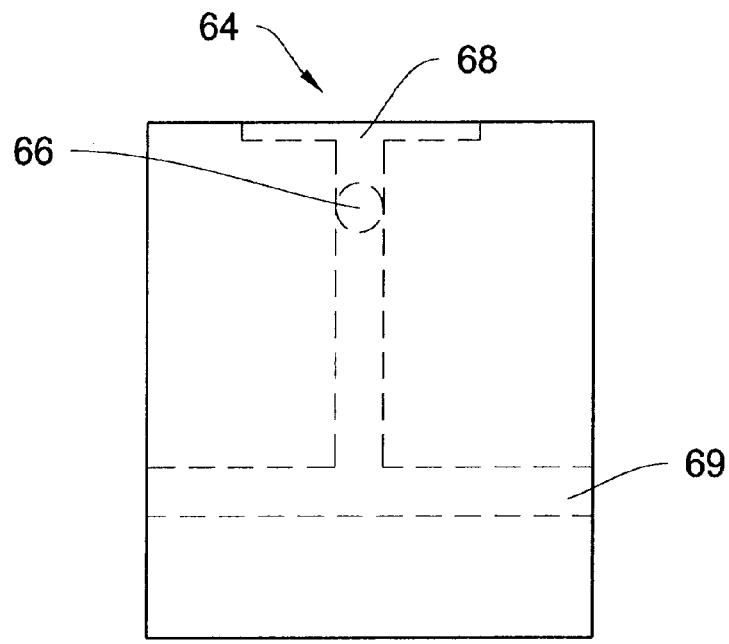
FIG. 9a is another side view of the embodiment shown in FIGS. 8a and 8b, however, the view is rotated by 90 degrees relative to FIGS. 8a and 8b.
Figure 9B:
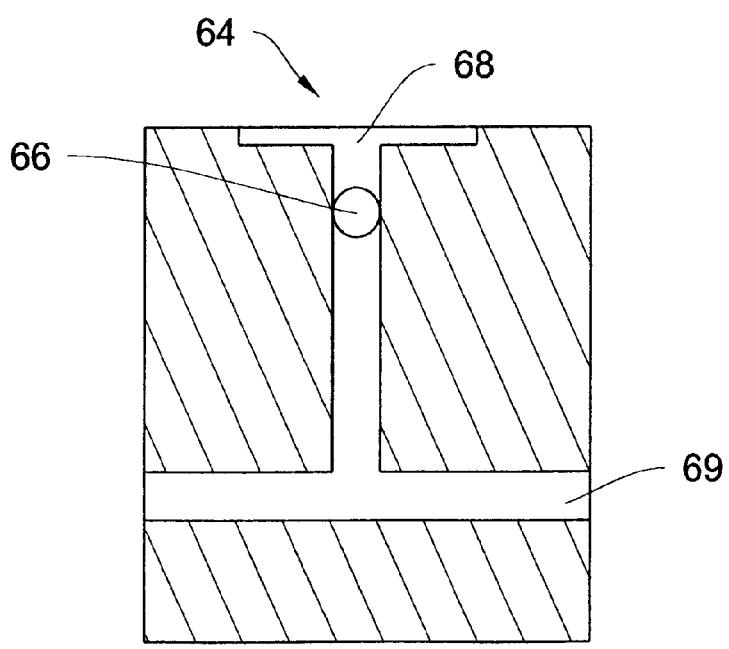

As illustrated in FIG. 5, one form of the sensing member 50 is a pin or rod type structure where the sensing portion 55 is located at a first end of a central shaft 62 and the fluid flow regulation portion 60, is located at a second end of the central shaft 62. In the embodiment illustrated in this figure the fluid flow regulation portion 60 is a tapered structure, tapering radially outward to a larger diameter at its distal end than that of the central shaft 62. This embodiment, the flow occlusion chamber 24 is adapted to receive closely the fluid flow regulation portion 60 and when in the closed position. This is clearly illustrated in FIG. 1. The sensing member 50 is biased into the closed position by a biasing structure 80 such as a spring, or the like. The open position of the assembly is illustrated in FIG. 2.

One preferred embodiment of the assembly 1 has the sensing member receiving channel 22 extending between the fluid flow channel 16 and the low pressure channel 20. Thus, in this orientation, when the sensing member 50 is received by the sensing member channel 22, it extends through the low pressure channel 20 and extends beyond the vacuum port 18. As illustrated in the figures, the assembly 1 may include a vacuum cup 90 that is located in a position where the vacuum port is in communication with the interior of the vacuum cup 90. However, it is within the scope of the present invention to have the sensing member receiving channel 22 extending between the fluid flow channel 20 to an exterior surface of the body 10. Therefore, the sensing member 50 may be either within or without the vacuum cup 90.

Figure 4:
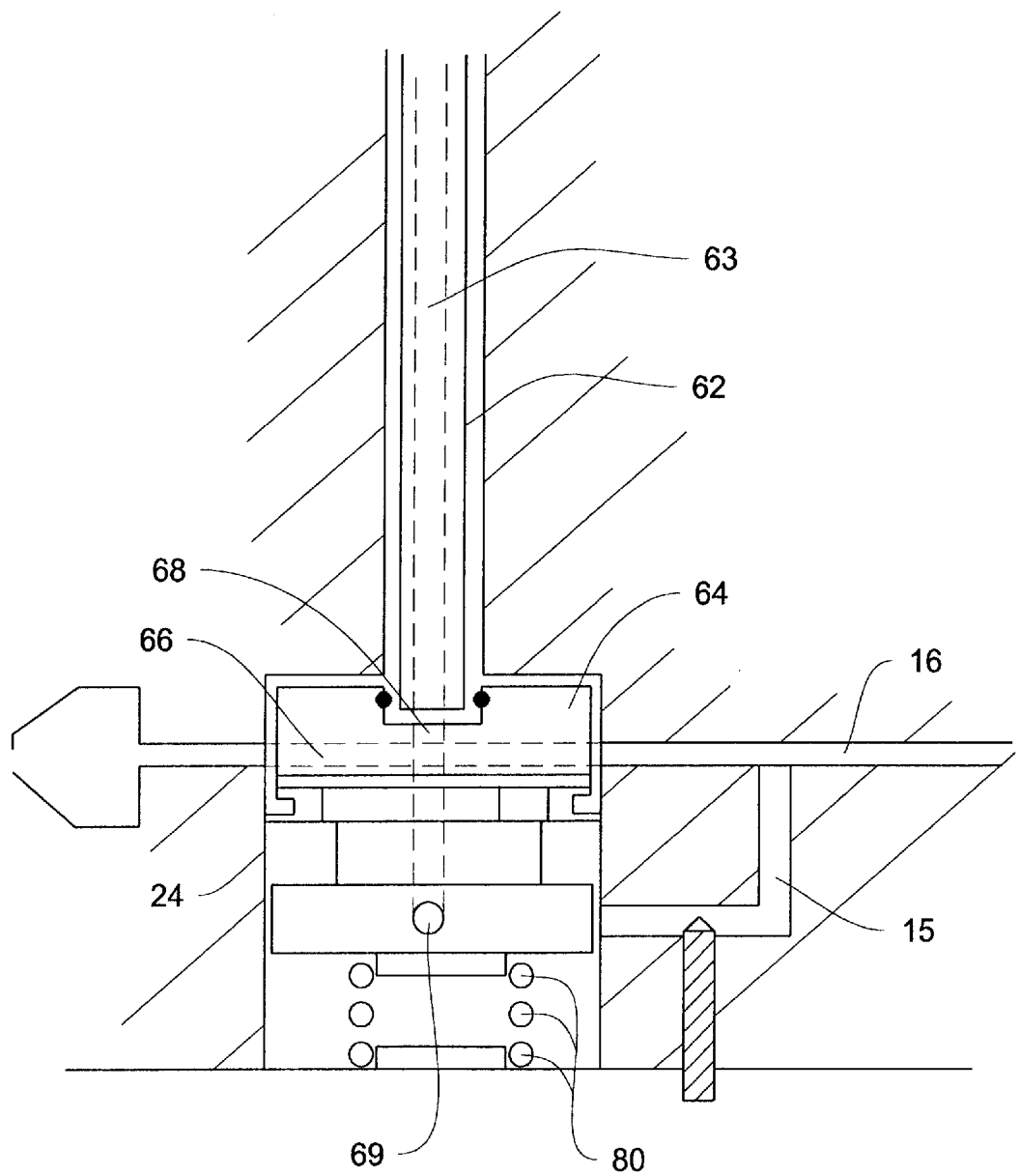
FIG. 4 is an embodiment of the sensing member of the present invention.

An alternate embodiment of the assembly 1 is illustrated in FIG. 4. In this embodiment, the sensing portion 60 of the sensing member 50 is a turnchannel 64 that is adapted to work in combination with, or is rotationally attached to, the central shaft 62. The turnchannel 64 is a piece that includes at least a turnchannel fluid flow channel 66. Thus, the turnchannel 64 rotates between the closed and open positions.

If the sensing member receiving channel 22 and the low pressure channel 20 are the same, such as when the low pressure channel receives the sensing member 50, then the turnchannel fluid flow channel 66 will further include a vacuum aperture 68 allowing fluid communication between the fluid flow channel 16 and the low pressure channel 20 through an interior vacuum channel 63 located within the central shaft 62.

Additionally, the body 10 may further includes a push-off channel 15 that extends between the flow occlusion chamber 24, which is also known as a turnchannel receiving chamber in this embodiment, and the fluid flow channel 16. The turnchannel 64 may further include a second push-off channel 69 that is in fluid communication with the low pressure channel of the body, said second push-off channel 69 being rotated with respect to the turnchannel flow channel 66. Then, when the turnchannel 64 is in the closed position, fluid flow is capable through the push-off channel 15 and the second push-off channel 69 and through the low-pressure channel 20 thereby creating a positive pressure, or push-off, at the vacuum port 18.

As used herein the term fluid means a body whose particles move easily among themselves and is a generic term that includes liquids and gases as species. For example, liquids such as water, gases such as air, and mixtures such as steam are considered fluids.

While these descriptions directly describe the above embodiments, it is understood that those skilled in the art may conceive modifications and/or variations to the specific embodiments shown and described herein. Any such modifications or variations that fall within the purview of this description are intended to be included therein as well. It is understood that the description herein is intended to be illustrative only and is not intended to be limitative. Rather, the scope of the invention described herein is limited only by the claims appended hereto.

What is claimed is:

1. An assembly for releasably securing objects by the use of a vacuum comprising:

A. a body having
  i. a fluid inlet port,
  ii. a fluid outlet port,
  iii. a fluid flow channel extending between the fluid inlet port and the fluid outlet port,
  iv. a vacuum port,
  v. a low pressure channel extending between the vacuum port and the fluid flow channel,
  vi. a sensing member receiving channel and
 B. a sensing member having
  i. a fluid flow regulation portion and
  ii. a sensing portion,
  iii. said sensing portion is further adapted to be movably received by the sensing member receiving channel, the sensing member being movable from a closed position to an open position,
  whereby when the sensing member is in the closed position the fluid flow channel is closed to the flow of fluids, and when the sensing member is in the open position the fluid flow channel is open to the flow of fluids, and when fluids flow through the flow channel a low pressure condition is created within the low-pressure channel.

2. The assembly according to claim 1 wherein the fluid flow regulation portion of the sensing member tapers radially outward from a first diameter to a second, larger diameter at its distal end, and the body further has a flow occlusion chamber that intersects the fluid flow channel and is adapted to receive the fluid flow regulation portion of the sensing member, whereby when the sensing member is in the closed position the taper of the fluid flow regulation portion closes the fluid flow channel to the flow of fluids.

3. The assembly according to claim 2 wherein the sensing member receiving channel extends between the fluid flow channel and the low pressure channel and is oriented such that when the sensing member receiving channel receives the sensing member, the sensing portion extends through at least a portion of the low pressure channel and projects through the vacuum port.

4. The assembly according to claim 3 wherein the assembly further includes a vacuum cup with an interior that is in fluid communication with the vacuum port.

5. The assembly according to claim 1 wherein the body further includes a turnchannel receiving chamber that is located at the intersection of the low pressure channel and the fluid flow channel, and the fluid flow regulation portion of the sensing member is a turnchannel with a turnchannel flow channel having a vacuum aperture extending from the turnchannel flow channel to a top of the turnchannel, wherein the turnchannel rotates from the open position to the closed positions of the sensing member.

6. The assembly according to claim 5 wherein the body further includes a push-off channel that extends between the turnchannel receiving chamber and the fluid flow channel, and the turnchannel further includes a second push-off channel that is in fluid communication with the low pressure channel of the body, said second push-off channel being rotated with respect to the turnchannel flow channel, whereby when the turnstile is in the closed position, fluid flow is capable through the push-off channel and the second push-off channel and through the low-pressure channel thus creating a positive pressure at the vacuum port.

7. The assembly according to claim 6 wherein the sensing member receiving channel extends between the fluid flow channel and the low pressure channel and is oriented such that when the sensing member receiving channel receives the sensing member, the sensing portion extends through at least a portion of the low pressure channel and projects through the vacuum port.

8. The assembly according to claim 7 wherein the assembly further includes a vacuum cup with an interior that is in fluid communication with the vacuum port.

9. An assembly for releasably securing objects by the use of a vacuum comprising:
A. a body having
  i. a fluid inlet port,
  ii. a fluid outlet port,
  iii. a fluid flow channel extending between the fluid inlet port and the fluid outlet port,
  iv. a vacuum port,
  v. a low pressure channel extending between the vacuum port and the fluid flow channel,
  vi. a sensing member receiving channel, said sensing member receiving channel extends between the fluid flow channel and the low pressure channel
  vii. the body further has a flow occlusion chamber that intersects the fluid flow channel, and
B. a sensing member having
  i. a fluid flow regulation portion and
  ii. a sensing portion,
  iii. said sensing portion is further adapted to be movably received by the sensing member receiving channel, the sensing member being movable from a closed position to an open position,
  iv. said fluid flow regulation portion of the sensing member tapers radially outward from a first diameter to a second, larger diameter at its distal end, and
  v. said sensing portion extends through at least a portion of the low pressure channel and projects through the vacuum port,
  whereby when the sensing member is in the closed position the fluid flow channel is closed to the flow of fluids, and when the sensing member is in the open position the fluid flow channel is open to the flow of fluids, and when fluids flow through the flow channel a low pressure condition is created within the low pressure channel.

10. An assembly for releasably securing objects by the use of a vacuum comprising:
A. a body having
  i. a fluid inlet port,
  ii. a fluid outlet port,
  iii. a fluid flow channel extending between the fluid inlet port and the fluid outlet port,
  iv. a vacuum port,
  v. a low pressure channel extending between the vacuum port and intersecting the fluid flow channel,
  vi. a sensing member receiving channel,
  vii. a turnchannel receiving chamber that is located at the intersection of the low pressure channel and the fluid flow channel, and
B. a sensing member having
  i. a fluid flow regulation portion,
    (a) the fluid flow regulation portion of the sensing member is a turnchannel with a turnchannel flow channel having a vacuum aperture extending from the turnchannel flow channel to a top of the turnchannel, and
  ii. a sensing portion,
  iii. said sensing portion is further adapted to be movably received by the sensing member receiving channel, the turnchannel being rotatable from a closed position to an open position,
  whereby when the sensing member is in the closed position the fluid flow channel is closed to the flow of fluids, and when the sensing member is in the open position the fluid flow channel is open to the flow of fluids, and when fluids flow through the flow channel a low pressure condition is created within the low-pressure channel.

* * * * *